US012804795B2

(12) United States Patent
Scholze et al.

(10) Patent No.: US 12,804,795 B2
(45) Date of Patent: Nov. 17, 2026

(54) DEVICE AND METHOD FOR GENERATING IONS USING A PLASMA

(71) Applicant: LEIBNIZ-INSTITUT FÜR OBERFLÄCHENMODIFIZIERUNG E.V., Leipzig (DE)

(72) Inventors: Frank Scholze, Leipzig (DE); Fred Pietag, Leipzig (DE); Daniel Spemann, Leipzig (DE); Ronny Woyciechowski, Leipzig (DE)

(73) Assignee: LEIBNIZ-INSTITUT FÜR OBERFLÄCHENMODIFIZIERUNG E.V., Leipzig (DE)

( * ) Notice: Subject to any disclaimer, the term of this patent is extended or adjusted under 35 U.S.C. 154(b) by 80 days.

(21) Appl. No.: 18/836,935

(22) PCT Filed: May 15, 2023

(86) PCT No.: PCT/EP2023/063017

§ 371 (c)(1),
(2) Date: Aug. 8, 2024

(87) PCT Pub. No.: WO2023/222626

PCT Pub. Date: Nov. 23, 2023

(65) Prior Publication Data

US 2025/0151188 A1 May 8, 2025

(30) Foreign Application Priority Data

May 16, 2022 (DE) .................... 10 2022 112 149.6

(51) Int. Cl.
*H05H 1/54* (2006.01)
*F03H 1/00* (2006.01)
(Continued)

(52) U.S. Cl.
CPC ............ *H05H 1/54* (2013.01); *F03H 1/0081* (2013.01); *H05H 1/4652* (2021.05); *H05H 7/08* (2013.01); *H05H 2007/082* (2013.01)

(58) Field of Classification Search
CPC .. H05H 1/54; H05H 1/465; F03H 1/00–0031; F03H 1/0081–0093; G21B 1/00–25
(Continued)

(56) References Cited

U.S. PATENT DOCUMENTS

2004/0173584 A1 9/2004 Onishi et al.
2009/0289179 A1 11/2009 Chen et al.
(Continued)

FOREIGN PATENT DOCUMENTS

CN 103247504 B 8/2013
CN 112160884 A 1/2021
(Continued)

*Primary Examiner* — Christopher M Raabe
(74) *Attorney, Agent, or Firm* — Smartpat PLC

(57) ABSTRACT

A device provides a simple and safe way of generating ions. The ions generated can be mixed and/or neutralized simply and without many additional parts and equipment. The device (10) required for this purpose is very compact and inexpensive since only one excitation system (44) is required for two spatially and/or electrically separated regions (24, 26) of a plasma vessel (20). In this way, at least one complete excitation system can be dispensed with, resulting in additional space and more degrees of freedom (e.g. in the movement of the device itself). The device (10) can be used both as an ion engine and for material processing, and is therefore universally applicable, it being possible to precisely adjust the kinetic energy via the grid system (28, 30) and the current density via the gas flow and the power of the plasma excitation.

23 Claims, 4 Drawing Sheets

(51) Int. Cl.
*H05H 1/46* (2006.01)
*H05H 7/08* (2006.01)

(58) Field of Classification Search
USPC .......................................................... 313/359.1
See application file for complete search history.

(56) References Cited

U.S. PATENT DOCUMENTS

| | | | |
|---|---|---|---|
| 2011/0298376 | A1 | 12/2011 | Kanegae et al. |
| 2019/0232073 | A1 | 8/2019 | Winter et al. |
| 2024/0234093 | A1 * | 7/2024 | Oh .................... H01J 37/32422 |

FOREIGN PATENT DOCUMENTS

| | | | |
|---|---|---|---|
| DE | 3708161 | A1 | 10/1987 |
| DE | 10203543 | A1 | 10/2003 |
| DE | 102008058212 | A1 | 5/2010 |
| DE | 102010060591 | A1 | 6/2011 |
| DE | 102018113444 | | 10/2019 |

* cited by examiner

DEVICE AND METHOD FOR GENERATING IONS USING A PLASMA

CROSS-REFERENCE TO RELATED APPLICATION

This application is a national stage application, filed under 35 U.S.C. § 371, of International Patent Application PCT/EP2023/063017, filed on May 15, 2023, which claims the benefit of German Patent Application DE 10 2022 112 149.6, filed on May 16, 2022.

TECHNICAL FIELD

The present disclosure relates to a device for generating ions by means of a plasma and a method for generating ions by means of a plasma.

BACKGROUND

Generated ions generated can be used in a variety of applications.

For example, ions are used for material processing. After they are generated, the ions are usually accelerated via an adapted electric field so that they acquire a certain kinetic energy. In order to avoid shielding due to charge build-up, especially in the case of non-conductive materials (e.g. insulating substrates or targets), it is desirable to neutralize the ions.

In addition, electric propulsion systems based on grid ion engines have been used in space travel for many years for spooling into orbit, attitude correction of telecommunications satellites as well as for interplanetary and interstellar missions. Many future missions can also only be flown with electric propulsion systems due to the flight time, the mission profile and the amount of fuel required.

What all electric engines have in common is that the thrust generated is generated by accelerating ions in an electric field into free space. Due to the law of conservation of momentum, the flying object (e.g. a satellite or the like) experiences a momentum of the same magnitude as the repelled ions, but in the opposite direction. In order to generate the greatest possible thrust, the ions must have a large mass and be easily ionized. That is why xenon has been used as a fuel for electric drive systems for many years. However, due to the ever-increasing demand for xenon in other industries and the associated rising price, alternative fuels such as krypton, iodine and heavy molecules are being discussed, although these are usually more complex to handle and cannot be ionized as effectively as xenon.

Low-pressure plasma discharges are used to ionize the fuel gas. The ions generated in this process in turn always have a positive charge and are accelerated by a multi-aperture grid system. The grid system itself consists of a stack of electrically insulated grids that can be subjected to positive and negative voltages of up to several thousand volts. In the simplest case, a grid system consists of only two grids. But there are also configurations with up to four and five grids.

Generating thrust based on the ejection of ions with positive charge leads to an excess of negative charge carriers on the satellite and thus to the formation of a negative potential field around the satellite. This prevents further ejection of positive ions and thus the generation of thrust. Therefore, every satellite equipped with an ion engine has at least one neutralizer that generates the same amount of electrons as the ion engine and thus removes the excess negative charge. The neutralizer is arranged here in such a way that the beam of electrons is injected obliquely into the ion beam.

In addition to the hollow cathodes commonly used in space travel, plasma bridge neutralizers (PBNs) have become established as neutralizers. In this process, a high-density plasma is generated in a small space from which electrons are extracted, these being used to neutralize the space charge or ions as described above. The same excitation mechanisms are used for the plasma generation in the neutralizer as for the ion generation (hollow cathode, high frequency and ECR discharges). Simple hot cathodes are conceivable for use, but they are unsuitable due to their short service life, especially for space applications. To operate the neutralizers, a similar system of supply units is required as for the ion source, but with different parameters such as gas quantity, voltages and power. Due to redundancy requirements, these systems often exist in multiples. Another disadvantage of this design is that the generated electron beam is fired into the ion beam at an angle, resulting in an inhomogeneous or non-axisymmetric charge distribution.

Alternatively, use is also made of beam switches in which the voltages on the extraction grids are reversed in the kHz range so that ions and electrons are extracted alternately. On average over time, the effectively extracted proportion of ions is reduced here so that, in the case of surface treatment, the process times have to be increased accordingly to achieve the same result. With regard to highly stable process control, the use of a beam switch also represents another potential source of error.

SUMMARY

It is an object of the present disclosure to show a simple and safe way of generating ions. In particular, the ions should be able to be neutralized simply and without many additional parts and equipment. Preferably, generation should be possible with an inexpensive, compact ion beam source. Preferably, it should be possible to ensure highly stable process control with kinetic energies and current densities that can be adjusted in a defined manner.

This object is achieved with the device and the method as disclosed herein. Advantageous refinements are specified in the dependent claims and in the following description together with the figures.

The inventors recognized that this object could be achieved in a surprising and particularly simple way if the same means for plasma generation were used both for the generation of the ions and for the generation of the further charged particles. In other words, the discharge chamber for generating the plasma is divided into at least two spatially and/or electrically separated regions. Then the device can be kept very compact because only one means of plasma generation is used. Preferably, the discharge chamber for generating the plasma is manufactured in such a way that two electrically separated, in particular closely spaced plasma spaces are formed, with one plasma feeding the ion extraction and the other plasma feeding the generation of the further charged particles.

The device for generating ions by means of a plasma, there being a first chamber which serves for ion extraction and which is surrounded by means for generating the plasma, is characterized in that there is a second chamber which serves for the extraction of further charged particles which have been generated by a plasma, the second chamber likewise being surrounded by the means for generating the plasma, so that the means for generating the plasma feed both the plasma in the first chamber and the plasma in the second chamber.

In one advantageous refinement, provision is made for the means for generating the plasma to comprise an induction coil, the first chamber and the second chamber being arranged inside the induction coil. This makes the structure particularly simple and requires little installation space.

In one advantageous refinement, provision is made for the second chamber to be arranged in the first chamber, the first chamber preferably being arranged concentrically around the second chamber. This allows the charged particles from the second chamber to be radiated coaxially into the ions generated in the first chamber.

In one advantageous refinement, provision is made for the first chamber to be arranged electrically insulated from the second chamber, the first chamber and/or the second chamber preferably having an electrically insulating wall material, the wall material in particular being a ceramic material. This allows the structure to be kept particularly simple and compact.

In one advantageous refinement, provision is made for the first chamber and/or the second chamber to have at least one extraction opening, the extraction opening preferably having at least one aperture. This makes it easy to extract the ions or charged particles from the device and also to shape the beam.

In one advantageous refinement, provision is made for at least one grid, preferably a grid system, to be arranged in the extraction opening. This makes it easy to define the parameters of the beam currents.

In one advantageous refinement, provision is made for the grid system to have a bias grid, preferably in the form of a metal foil, in particular a molybdenum foil, and an extraction grid, there preferably being one or more further grids. This makes the grid system particularly simple to construct. If more than two grids are used, a more defined beam shaping can be achieved. In addition, such additional grids can also serve as erosion protection. Instead of a molybdenum foil, other high-melting metals and alloys such as titanium and tungsten or even graphite, pyrographite and CFC can also be used.

In one advantageous refinement, provision is made for the second chamber to serve for electron extraction and thereby form a neutralizer for the ions generated. This means that the device can be used to process insulating materials or as an ion drive.

In one advantageous refinement, provision is made for the second chamber to serve for ion extraction. This can provide a second ion source for other ion species.

In a method for generating ions by means of a plasma, there is a first chamber which serves for ion extraction and which is surrounded by means for generating the plasma. The method is characterized in that further charged particles are generated and extracted in a second chamber, the further charged particles being generated by means of a plasma, so that the means for generating the plasma feed both the plasma in the first chamber and the plasma in the second chamber.

In one advantageous refinement, provision is made for the device to be used.

In one advantageous refinement, provision is made for the plasma to be generated by applying a high frequency to an induction coil, preferably in the range from 0.9 to 100 Mhz. This allows the discharge to be carried out particularly efficiently.

In one advantageous refinement, provision is made for electrons to be generated in the second chamber and extracted therefrom in order to neutralize the ions generated in the first chamber, the neutralized ions preferably being used in an ion beam source for material processing or in an ion engine. This means that both the material processing of insulating materials and the ion drive are particularly efficient and process-stable.

In one advantageous refinement, provision is made for ions to be generated in the second chamber and extracted therefrom in order to mix these ions with the ions generated in the first chamber. This makes it particularly easy to generate mixtures of different ion species within an ion source.

The features and further advantages of the present invention will become clear below from the description of a preferred exemplary embodiment in conjunction with the figures.

DETAILED DESCRIPTION

Figure 1:
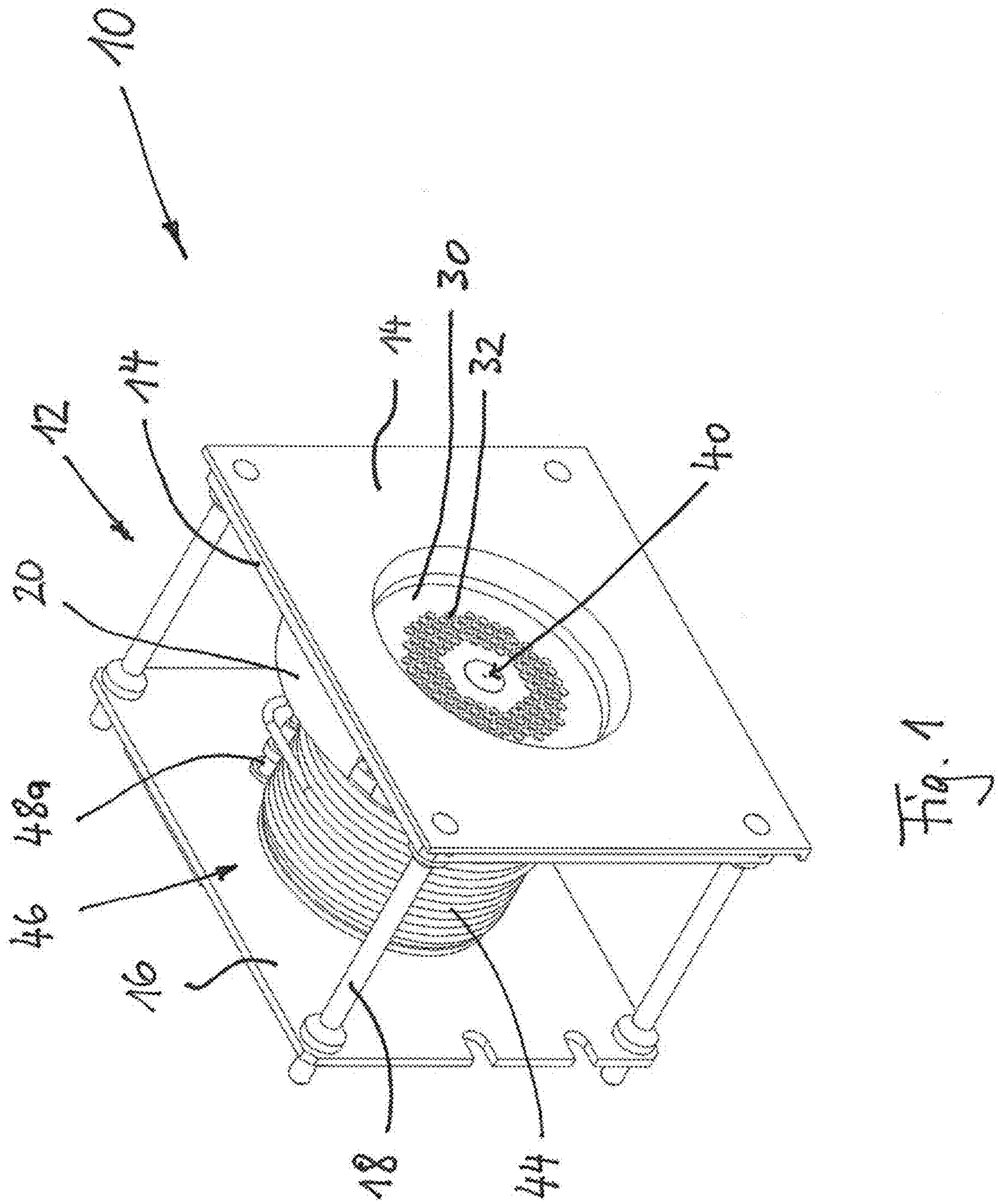
FIG. 1 shows the device for ion generation according to a preferred configuration in a perspective view from the front.
Figure 2:
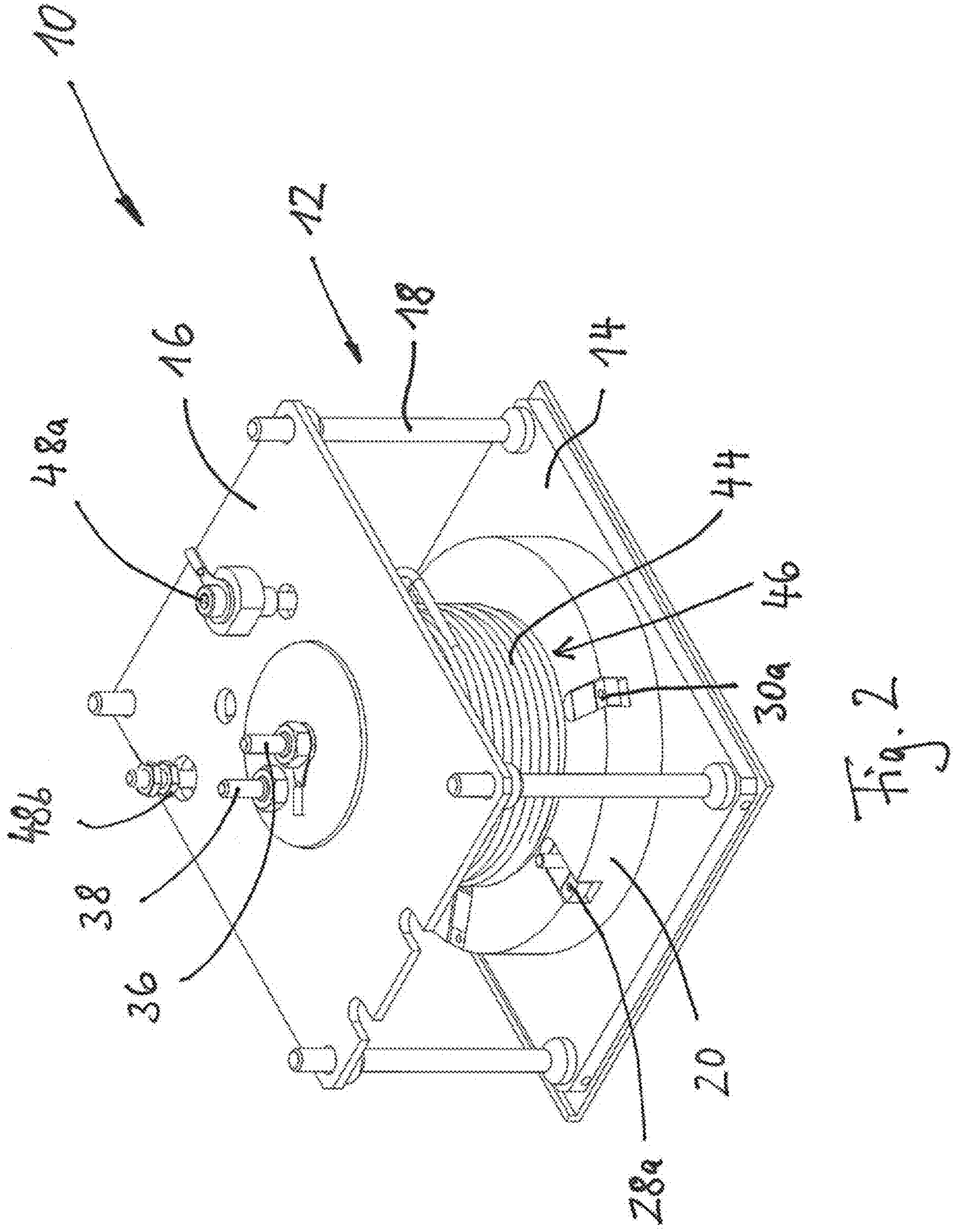
FIG. 2 shows the device according to FIG. 1 in a perspective view from behind.
Figure 3:
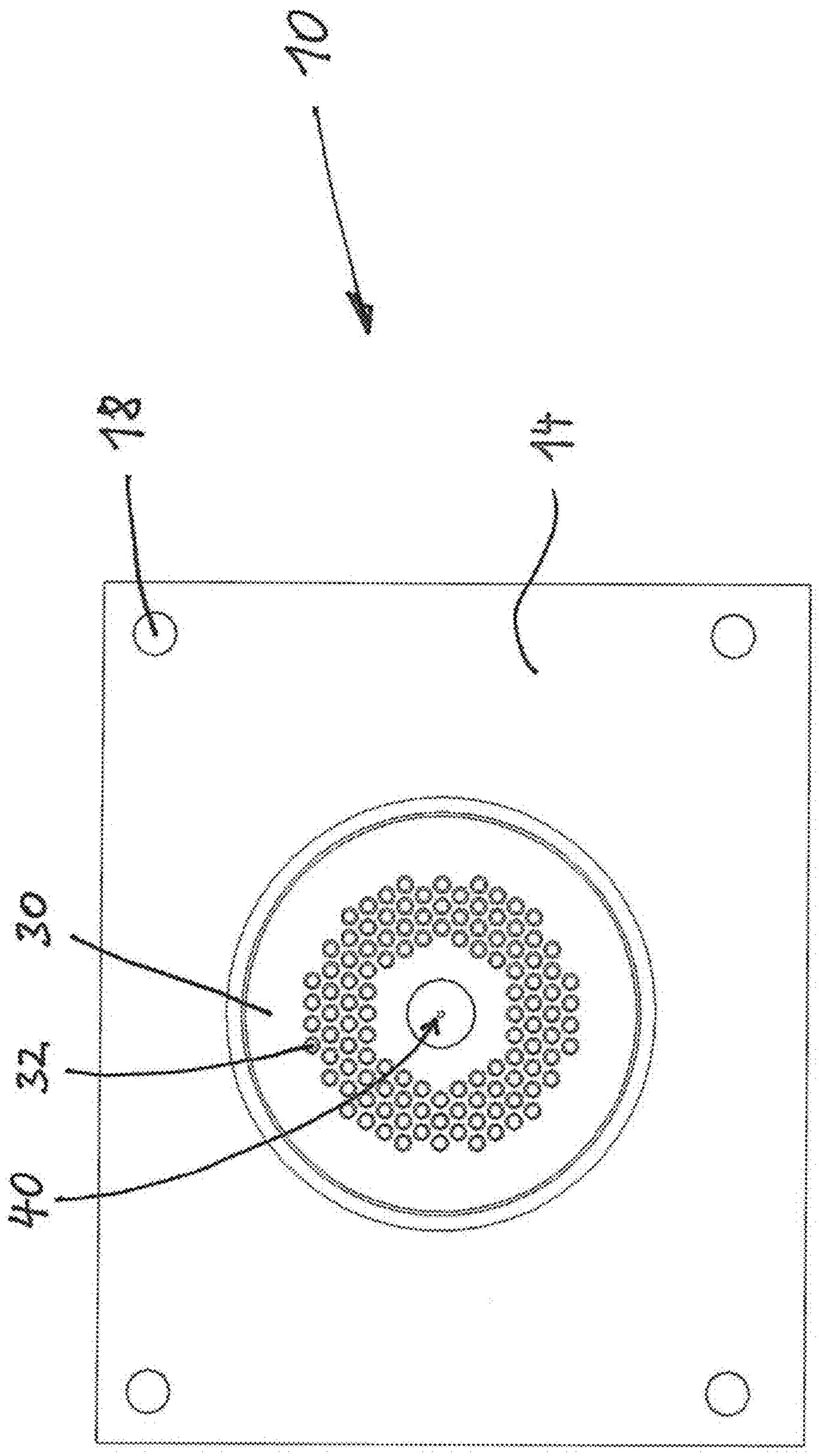
FIG. 3 shows the device according to FIG. 1 in plan view from the front and FIG. 4 shows the device according to FIG. 1 in a sectional view.
Figure 4:
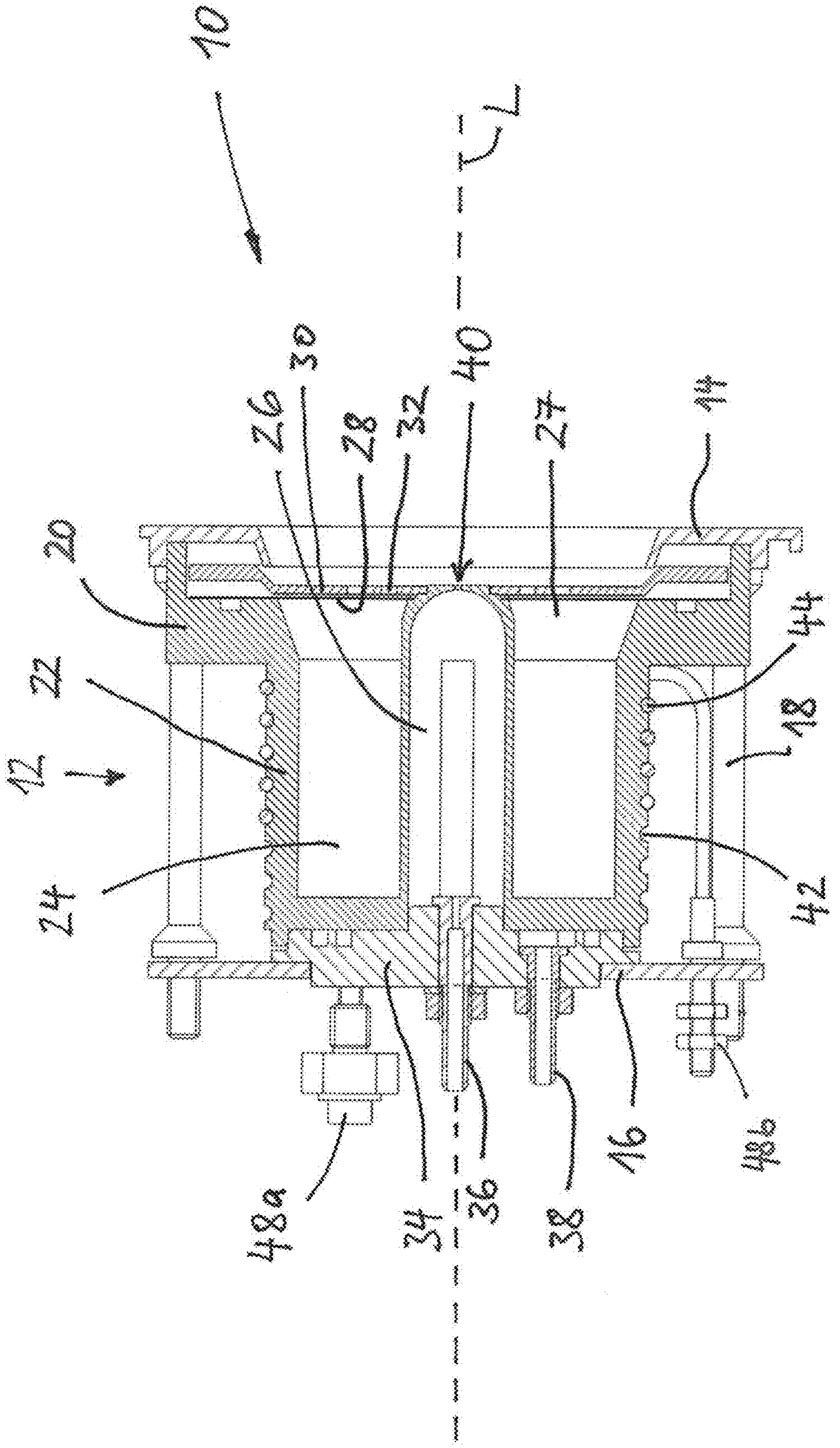

FIGS. 1 to 4 show the device 10 for generating ions according to a preferred configuration in various views.

As can be seen, the device 10 has a housing 12 which comprises a front 14, a rear wall 16 and struts 18 connecting them. A plasma vessel 20 is arranged between the front 14 and the rear wall 16. The front 14 forms the end of the plasma vessel 20 and centres and fixes it.

The plasma vessel 20 is integrally connected to a coaxial wall formation 22 which encloses a first discharge chamber 24 in a first annular section and encloses a second discharge chamber 26 in a second cylindrical section. These discharge chambers 24, 26 are thus spatially separated from each other.

Preferably, the discharge chambers 24, 26 are approximately 40 mm in length, the first discharge chamber 24 is 40 mm in diameter and the second discharge chamber 26 is 14 mm in diameter.

The first discharge chamber 24 has an extraction opening 27 which is defined by the wall 22 and the front 14 and which is closed by a perforated foil 28 acting as a screen grid, which is preferably a molybdenum foil. This perforated foil 28 is preferably 0.2 mm thick. This perforated foil 28 is kept at a potential of 1.4 to 1.5 keV and thus draws a beam current of approximately 20 mA. This perforated foil 28 thus acts as a bias grid.

The wall formation 22 preferably consists of an insulator, in particular of a ceramic, so that the two discharge chambers 24, 26 are electrically insulated from one another.

An extraction grid 30 having numerous apertures 32 is arranged in front of the perforated foil 28 at a small distance of, for example, 0.5 mm. This extraction grid 30 is preferably made of graphite and is 1 mm thick. It is at a potential of approximately −400 eV, the ions generated thereby being extracted and accelerated through the apertures 32.

The connections 28*a*, 30*a* are provided for applying the respective potential to the perforated foil 28 and the grid 30.

The second discharge chamber 26 is closed by the rear cover 34, in which the central gas inlet 36 for the second discharge chamber 26 and the gas inlet 38 for the first discharge chamber 24 are located. The gas inlet 36 for the second discharge chamber is designed to be electrically conductive so that a potential could be applied to it. This allows the positive charges to be discharged during the extraction of electrons. In addition, the electrons generated in the second discharge chamber 26 could thereby be accelerated if necessary.

At the front, there is a hole 40 that is 0.5 mm in diameter in the wall formation 22. The electrons generated in the second chamber 26 are extracted through this hole 40. No separate grid is required for this because the ions generated in the first chamber 24 build up a space charge zone, that latter pulling the electrons generated in the second chamber 26 out through the hole 40 via a plasma bridge. Very high currents of approximately 20 mA flow here. This corresponds to the beam current drawn off via the foil 28, so that the total charge is balanced again. The design of the device 10 thus guarantees that the same amount of current of ions and electrons is generated. The electrons extracted from the hole 40 neutralize the ions extracted from the first chamber 24.

In principle, all typical working gases, that is to say all ionizable gaseous species such as noble gases, oxygen, nitrogen and reactive gases, can be used as working gases for ion generation. As far as an ion engine is concerned, xenon and krypton are usually used. The electrons can be generated using the same working gas or a different one, for example a lighter one in space travel, because this gas does not have to be used for thrust and therefore weight could be saved.

Instead of a single hole 40, several holes could also be used. Alternatively or additionally, an accelerating grid for the electrons could be used.

Windings 44 of an induction coil 46 are placed around the outer wall shape 22 in corresponding recesses 42, which serve to generate plasma in the two chambers 24, 26. Since both chambers 24, 26 are located within the induction coil 46, both discharges are fed by a single excitation, these being are operated independently of each other due to the electrical insulation. A high frequency, preferably in the range from 0.9 to 100 MHz, is applied to the induction coil 46 via the electrical connection 48*a*, 48*b*. Thus, due to the spatial arrangement of the two plasma spaces in the chambers 24, 26, only one induction coil 46 and one high frequency supply (not shown) are required to excite both discharges, which considerably reduces the complexity of the system. In addition to the common coil geometries such as cylinder, cone and planar coils, other cross-sectional shapes such as rectangles, trapezoids or any round and n-sided shapes are also possible, it being possible for the geometric dimensions thereof also to vary along the longitudinal axis L of the device 10.

The device for generating ions has been explained above using an example in which the second chamber 26 is arranged coaxially within the first chamber 24. The first chamber could also be arranged coaxially within the second chamber. In addition, any other arrangements and geometries of the two chambers could be used, two or more first chambers and/or two or more second chambers could also be used. These first and second chambers could each generate different charged particles. It is essential that the first chamber and the second chamber have separate discharges, but are fed by the same excitation.

Furthermore, the device has been described using an example in which the ions generated in the first chamber 24 are neutralized by electrons generated in the second chamber 26.

Alternatively, ions could likewise also be generated in the second chamber, it being possible for these to be a different ion species.

In addition, there could be several different first chambers in which different ion species are generated and there could be one or more second chambers for generating electrons for their neutralization.

It is clear from the above that the present disclosure provides a simple and safe way to generate ions. The ions generated can be mixed and/or neutralized simply and without many additional parts and equipment. The device required for this purpose is very compact and inexpensive since only one excitation system is required for two spatially and/or electrically separated regions 24, 26 of a plasma vessel 20. In this way, at least one complete excitation system can be dispensed with, resulting in additional space and more degrees of freedom (e.g. in the movement of the device itself). The device 10 can be used both as an ion engine and for material processing, and is therefore universally applicable, it being possible to precisely adjust the kinetic energy via the grid system 28, 30 and the current density via the gas flow and the power of the plasma excitation.

When used as an ion engine, the device 10 simultaneously generates a beam of positive ions and electrons neutralizing them, the current intensity thereof being identical in magnitude. Due to the law of conservation of momentum, the ion beam generates the necessary thrust for the missile and the electrons carry away the excess negative charges created by the ion generation in the plasma, thus preventing the missile from becoming charged. Since the electron beam largely exits in the direction of the ion beam, a good coupling between ions and electrons and a continuous beam neutralization is achieved.

When used as an ion source in the processing of materials, the device 10 likewise simultaneously generates a beam of positive and negative charge carriers. These can then be used on electrically insulating materials (substrates or targets). They are incident on the surface there and lead to interaction processes, such as material removal, layer and surface modification and, as a side effect, to layer growth. Because the same number of positive and negative charge carriers are incident on the material, charging of the material is avoided, which in the case of electrically insulating materials would otherwise lead to repulsion of the ions and consequently to an unstable process.

Individual features from the description of an exemplary embodiment do not necessarily have to be combined with one or more or all of the other features specified in the description of that exemplary embodiment; in this regard, each sub-combination is expressly also disclosed. In addition, physical features of a device can also be reformulated and used as process features, and process features can be reformulated and used as physical features of a device. Such a reformulation is therefore automatically also disclosed.

LIST OF REFERENCE SYMBOLS

10 Device for generating ions according to a preferred configuration
12 Housing

14 Front
16 Rear wall
18 Struts
20 Plasma vessel
22 Wall formation
24 First discharge chamber, first chamber
26 Second discharge chamber, second chamber
27 Opening in first discharge chamber 24, extraction opening
28 Perforated foil, bias grid or screen grid
28*a* Connection for perforated foil 28
30 Extraction grid
30*a* Connection for extraction grid 30
32 Apertures
34 Cover
36 Central gas inlet for the second discharge chamber 26
38 Gas inlet for the first discharge chamber 24
40 Hole in second discharge chamber 26, extraction opening
42 Recesses in the outer wall shape 22
44 Windings
46 Induction coil
48*a*, 48*b* High frequency electrical connection of the induction coil 46
L Longitudinal axis of the device 10

The invention claimed is:

1. A device (10) for generating ions by a plasma, comprising:

a first chamber (24) which serves for ion extraction and which is surrounded by an induction coil (46) for generating the plasma, the first chamber (24) having an extraction opening (27);

at least one grid (28, 30) arranged in the extraction opening (27); and a second chamber (26) which serves for extraction of further charged particles which have been generated by a further plasma, the second chamber (26) also being surrounded by the induction coil (46), wherein the induction coil (46) feeds both the plasma in the first chamber (24) and the further plasma in the second chamber (26), and wherein the first chamber (24) and the second chamber (26) are arranged inside the induction coil (46).

2. The device (10) according to claim 1, wherein the first chamber (24) is arranged concentrically around the second chamber (26).

3. The device (10) according to claim 1, wherein the first chamber (24) is electrically insulated from the second chamber (26).

4. The device (10) according to claim 3, wherein the first chamber (24) and/or the second chamber (26) has an electrically insulating wall material (22).

5. The device (10) according to claim 4, wherein the electrically insulating wall material (22) is a ceramic material.

6. The device (10) according to claim 1, wherein the second chamber (26) comprises a further extraction opening (40).

7. The device (10) according to claim 1, wherein the extraction opening (27) has at least one aperture (32).

8. The device (10) according to claim 1, wherein the at least one grid (28, 30) is part of a grid system arranged in the extraction opening (27).

9. The device according to claim 8, wherein the grid system has a bias grid (28) and an extraction grid (30).

10. The device according to claim 8, wherein the grid system has a bias grid (28) in the form of a molybdenum foil, an extraction grid (30), and one or more further grids.

11. The device (10) according to claim 8, wherein the second chamber (26) serves for electron extraction and thereby forms a neutralizer for the ions generated, or wherein the second chamber (26) serves for further ion extraction.

12. The device (10) according to claim 1, wherein the second chamber (26) is arranged in the first chamber (24).

13. A method for generating ions by a plasma, comprising:

providing a first chamber (24) which serves for ion extraction and which is surrounded by and arranged inside an induction coil (46), the first chamber (24) having an extraction opening (27) and at least one grid (28, 30) arranged in the extraction opening (27); and generating and extracting further charged particles in a second chamber (26), wherein the further charged particles are generated by a further plasma, and wherein the induction coil (46) feeds both the plasma in the first chamber (24) and the further plasma in the second chamber (26).

14. The method according to claim 13, wherein the plasma is generated by applying a frequency from 0.9 to 100 MHz to the induction coil (46).

15. The method according to claim 13, further comprising generating electrons in the second chamber (26) and extracting the electrons from the second chamber (26) to neutralize ions generated in the first chamber (24).

16. The method according to claim 15, further comprising using neutralized ions in an ion beam source for material processing or in an ion engine.

17. The method according to claim 13, further comprising generating further ions in the second chamber (26), extracting the further ions from the second chamber (26), and mixing the further ions with the ions generated in the first chamber (24).

18. The device according to claim 1, further comprising a rear cover (34), wherein the first chamber (24) is annular and has a first axial end at which the extraction opening (27) is arranged and a second axial end opposite the first axial end, and wherein the rear cover (34) closes the second axial end of the first chamber (24) except for a gas inlet (38).

19. The device according to claim 1, further comprising a rear cover (34), wherein the second chamber (26) has a front axial end and a rear axial end opposite the front axial end, wherein the rear cover (34) closes the rear axial end of the second chamber (26) and includes a central gas inlet (36) communicating with the second chamber (26), and wherein a wall formation (22) closes the front axial end of the second chamber (26) except for an extraction opening formed by a hole (40).

20. The device according to claim 1, further comprising recesses (42) formed in an outer wall of a wall formation (22) surrounding the first chamber (24), wherein windings (44) of the induction coil (46) are received in the recesses (42).

21. The device according to claim 20, wherein the wall formation (22) defines the first chamber (24) in an annular section and defines the second chamber (26) in a cylindrical section.

22. The device according to claim 20, further comprising:

a housing (12) having a front (14), a rear wall (16), and struts (18) connecting the front (14) to the rear wall (16); and a plasma vessel (20) arranged between the front (14) and the rear wall (16), wherein the plasma vessel (20) is integrally connected to the wall formation (22).

23. The device according to claim 1, further comprising:

wherein the at least one grid (28, 30) is electrically conductive and is configured to be held at an electrical potential.

* * * * *